United States Patent
Maalouf et al.

(10) Patent No.: US 10,823,079 B2
(45) Date of Patent: Nov. 3, 2020

(54) METERED ORIFICE FOR MOTORING OF A GAS TURBINE ENGINE

(71) Applicant: United Technologies Corporation, Farmington, CT (US)

(72) Inventors: Fadi S. Maalouf, East Hampton, CT (US); Matthew E. Bintz, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 253 days.

(21) Appl. No.: 15/363,434

(22) Filed: Nov. 29, 2016

(65) Prior Publication Data

US 2018/0149090 A1    May 31, 2018

(51) Int. Cl.
*F02C 7/27* (2006.01)
*F01D 19/02* (2006.01)
(Continued)

(52) U.S. Cl.
CPC .............. *F02C 7/27* (2013.01); *B64D 27/10* (2013.01); *B64D 31/02* (2013.01); *B64D 31/12* (2013.01); *F01D 19/02* (2013.01); *F02C 7/26* (2013.01); *F02C 7/277* (2013.01); *F05D 2220/323* (2013.01); *F05D 2260/85* (2013.01); *F05D 2270/114* (2013.01); *F05D 2270/304* (2013.01)

(58) Field of Classification Search
None
See application file for complete search history.

(56) References Cited

U.S. PATENT DOCUMENTS

| 1,951,875 A | 3/1934 | Laabs |
| 2,514,949 A * | 7/1950 | Guedon ................. G11B 17/16 |
| | | 369/206 |

(Continued)

FOREIGN PATENT DOCUMENTS

| EP | 1258618 A2 | 11/2002 |
| EP | 2305986 | 4/2011 |

(Continued)

OTHER PUBLICATIONS

EP Application No. 17200204.0 Extended EP Search Report dated May 15, 2018, 6 pages.

(Continued)

*Primary Examiner* — Todd E Manahan
*Assistant Examiner* — Kyle Robert Thomas
(74) *Attorney, Agent, or Firm* — Cantor Colburn LLP

(57) ABSTRACT

A system for motoring a gas turbine engine of an aircraft is provided. The system includes an air turbine starter operable to drive rotation of a starting spool of the gas turbine engine and a starter air valve operable to deliver compressed air to the air turbine starter in response to the starter air valve being open. The system also includes a metered orifice coupled in a bypass configuration around the starter air valve to deliver a reduced amount of the compressed air to the air turbine starter while the starter air valve is closed. The reduced amount of the compressed air delivered to the air turbine starter limits a motoring speed of the gas turbine engine below a resonance speed of the starting spool of the gas turbine engine.

19 Claims, 5 Drawing Sheets

(51) Int. Cl.
*B64D 31/12* (2006.01)
*F02C 7/26* (2006.01)
*F02C 7/277* (2006.01)
*B64D 27/10* (2006.01)
*B64D 31/02* (2006.01)

(56) References Cited

U.S. PATENT DOCUMENTS

| | | |
|---|---|---|
| 2,617,253 A | 11/1952 | Fusner et al. |
| 2,840,987 A | 7/1958 | Bloomberg et al. |
| 2,962,597 A | 11/1960 | Evans |
| 3,057,155 A | 10/1962 | Rizk |
| 3,098,626 A | 7/1963 | Messinger |
| 3,151,452 A | 10/1964 | Bunger et al. |
| 3,764,815 A | 10/1973 | Habock et al. |
| 3,793,905 A | 2/1974 | Black et al. |
| 3,812,378 A | 5/1974 | Coman |
| 3,898,439 A | 8/1975 | Reed et al. |
| 3,951,008 A | 4/1976 | Schneider et al. |
| 4,044,550 A | 8/1977 | Vermilye |
| 4,069,424 A | 1/1978 | Burkett |
| 4,144,421 A | 3/1979 | Sakai |
| 4,380,146 A | 4/1983 | Yannone et al. |
| 4,598,551 A | 7/1986 | Dimitroff, Jr. et al. |
| 4,627,234 A | 12/1986 | Schuh |
| 4,669,893 A | 6/1987 | Chalaire et al. |
| 4,702,273 A | 10/1987 | Allen, Jr. et al. |
| 4,713,985 A | 12/1987 | Ando |
| 4,733,529 A | 3/1988 | Nelson et al. |
| 4,854,120 A | 8/1989 | Nelson et al. |
| 4,979,362 A | 12/1990 | Vershure, Jr. |
| 4,979,365 A | 12/1990 | Baker |
| 5,103,629 A | 4/1992 | Mumford et al. |
| 5,123,239 A | 6/1992 | Rodgers |
| 5,127,220 A | 7/1992 | Jesrai et al. |
| 5,174,109 A | 12/1992 | Lampe |
| 5,184,458 A | 2/1993 | Lampe et al. |
| 5,201,798 A | 4/1993 | Hogan |
| 5,349,814 A | 9/1994 | Ciokajlo et al. |
| 6,146,090 A | 11/2000 | Schmidt |
| 6,168,377 B1 | 1/2001 | Wolfe et al. |
| 6,190,127 B1 | 2/2001 | Schmidt |
| 6,305,156 B1 | 10/2001 | Lui |
| 6,318,958 B1 | 11/2001 | Giesler et al. |
| 6,478,534 B2 | 11/2002 | Bangert et al. |
| 6,498,978 B2 | 12/2002 | Leamy et al. |
| 6,517,314 B1 | 2/2003 | Burnett et al. |
| 6,558,118 B1 | 5/2003 | Brisson et al. |
| 6,681,579 B2 | 1/2004 | Lane et al. |
| 6,762,512 B2 | 7/2004 | Nelson |
| 6,884,027 B2 | 4/2005 | Faulkner |
| 6,935,836 B2 | 8/2005 | Ress, Jr. et al. |
| 7,104,072 B2 | 9/2006 | Thompson |
| 7,133,801 B2 | 11/2006 | Song |
| 7,409,319 B2 | 8/2008 | Kant et al. |
| 7,428,819 B2 | 9/2008 | Cataldi et al. |
| 7,507,070 B2 | 3/2009 | Jones |
| 7,513,119 B2 | 4/2009 | Zielinski et al. |
| 7,543,439 B2 | 6/2009 | Butt et al. |
| 7,587,133 B2 | 9/2009 | Franke et al. |
| 7,742,881 B2 | 6/2010 | Muralidharan et al. |
| 7,770,400 B2 * | 8/2010 | Iasillo .................. F02C 7/22 |
| | | 60/39.281 |
| 7,909,566 B1 | 3/2011 | Brostmeyer |
| 7,972,105 B2 | 7/2011 | Dejoris et al. |
| 8,090,456 B2 | 1/2012 | Karpman et al. |
| 8,291,715 B2 | 10/2012 | Libera et al. |
| 8,306,776 B2 | 11/2012 | Ihara et al. |
| 8,744,634 B2 | 6/2014 | Purani et al. |
| 8,770,913 B1 | 7/2014 | Negron et al. |
| 8,776,530 B2 | 7/2014 | Shirooni et al. |
| 8,820,046 B2 | 9/2014 | Ross et al. |
| 8,918,264 B2 | 12/2014 | Jegu et al. |
| 9,046,111 B2 | 6/2015 | Harvey et al. |
| 9,086,018 B2 | 7/2015 | Winston et al. |
| 9,103,284 B2 * | 8/2015 | Erickson .............. F02C 7/22 |
| 9,121,309 B2 | 9/2015 | Geiger |
| 9,732,762 B2 | 8/2017 | Duong et al. |
| 10,125,690 B2 | 11/2018 | Zaccaria et al. |
| 2002/0173897 A1 | 11/2002 | Leamy et al. |
| 2003/0145603 A1 * | 8/2003 | Reed .................... F02C 7/047 |
| | | 60/787 |
| 2004/0000656 A1 * | 1/2004 | Wiggins .............. F02C 7/277 |
| | | 251/289 |
| 2004/0131138 A1 | 7/2004 | Correia et al. |
| 2004/0231334 A1 * | 11/2004 | Yamanaka ............ F02C 3/10 |
| | | 60/734 |
| 2007/0234738 A1 * | 10/2007 | Borcea ................. F02C 6/08 |
| | | 60/785 |
| 2009/0301053 A1 | 12/2009 | Geiger |
| 2010/0085676 A1 | 4/2010 | Wilfert |
| 2010/0095791 A1 | 4/2010 | Galloway |
| 2010/0132365 A1 | 6/2010 | Labala |
| 2010/0293961 A1 | 11/2010 | Tong et al. |
| 2010/0326085 A1 | 12/2010 | Veilleux |
| 2011/0077783 A1 | 3/2011 | Karpman et al. |
| 2011/0146276 A1 | 6/2011 | Sathyanarayana et al. |
| 2011/0153295 A1 | 6/2011 | Yerramalla et al. |
| 2011/0296843 A1 | 12/2011 | Lawson, Jr. |
| 2012/0240591 A1 | 9/2012 | Snider et al. |
| 2012/0266601 A1 | 10/2012 | Miller |
| 2012/0266606 A1 | 10/2012 | Zeiner et al. |
| 2013/0031912 A1 | 2/2013 | Finney et al. |
| 2013/0091850 A1 | 4/2013 | Francisco |
| 2013/0101391 A1 | 4/2013 | Szwedowicz et al. |
| 2013/0251501 A1 | 9/2013 | Araki et al. |
| 2014/0123673 A1 | 5/2014 | Mouze et al. |
| 2014/0154087 A1 | 6/2014 | Kirchner et al. |
| 2014/0199157 A1 | 7/2014 | Haerms et al. |
| 2014/0233089 A1 | 8/2014 | Fermann et al. |
| 2014/0241878 A1 | 8/2014 | Herrig et al. |
| 2014/0271152 A1 | 9/2014 | Rodriguez |
| 2014/0283527 A1 | 9/2014 | Ling et al. |
| 2014/0301820 A1 | 10/2014 | Lohse et al. |
| 2014/0318144 A1 | 10/2014 | Lazzeri et al. |
| 2014/0334927 A1 | 11/2014 | Hammerum |
| 2014/0366546 A1 | 12/2014 | Bruno et al. |
| 2014/0373518 A1 | 12/2014 | Manneville et al. |
| 2014/0373532 A1 | 12/2014 | Diemer et al. |
| 2014/0373533 A1 | 12/2014 | Jensen et al. |
| 2014/0373552 A1 | 12/2014 | Zaccaria et al. |
| 2014/0373553 A1 * | 12/2014 | Zaccaria .............. F02C 7/277 |
| | | 60/778 |
| 2014/0373554 A1 | 12/2014 | Pech et al. |
| 2015/0016949 A1 | 1/2015 | Smith |
| 2015/0096359 A1 | 4/2015 | Catt |
| 2015/0115608 A1 | 4/2015 | Draper |
| 2015/0121874 A1 | 5/2015 | Yoshida et al. |
| 2015/0128592 A1 | 5/2015 | Filiputti et al. |
| 2015/0159625 A1 | 6/2015 | Hawdwicke, Jr. et al. |
| 2015/0167553 A1 | 6/2015 | Nesdill et al. |
| 2016/0332736 A1 * | 11/2016 | Parmentier ........... F02C 6/206 |
| 2016/0348588 A1 | 12/2016 | Ross et al. |
| 2017/0016399 A1 * | 1/2017 | Bedrine ................ F02C 6/02 |
| 2017/0233089 A1 | 8/2017 | Zaccaria et al. |
| 2017/0234235 A1 | 8/2017 | Pech |
| 2017/0234238 A1 | 8/2017 | Schwarz et al. |
| 2017/0342908 A1 | 11/2017 | Hon et al. |
| 2018/0022463 A1 | 1/2018 | Teicholz et al. |
| 2018/0022464 A1 | 1/2018 | Gelwan et al. |
| 2018/0022465 A1 | 1/2018 | Gelwan et al. |
| 2018/0023413 A1 | 1/2018 | Chowdhury et al. |
| 2018/0023479 A1 | 1/2018 | Clauson et al. |
| 2018/0023484 A1 | 1/2018 | Gelwan et al. |
| 2018/0045122 A1 * | 2/2018 | Veilleux ............... F01D 21/003 |
| 2018/0094588 A1 | 4/2018 | Clauson et al. |
| 2018/0230946 A1 | 8/2018 | Virtue, Jr. et al. |

FOREIGN PATENT DOCUMENTS

| | | |
|---|---|---|
| EP | 2514949 A2 | 10/2012 |
| EP | 3205836 A1 | 8/2017 |
| EP | 3205843 A1 | 8/2017 |

(56) References Cited

FOREIGN PATENT DOCUMENTS

| | | |
|---|---|---|
| EP | 3205849 A1 | 8/2017 |
| EP | 3205859 A1 | 8/2017 |
| EP | 3208429 A1 | 8/2017 |
| EP | 3273007 A1 | 1/2018 |
| EP | 3273008 A1 | 1/2018 |
| FR | 2933131 | 1/2010 |
| GB | 717183 | 10/1954 |
| GB | 1186375 | 4/1970 |
| GB | 1374810 | 11/1974 |
| GB | 2117842 | 10/1983 |
| IN | 201408865 | 5/2015 |
| JP | 2002371806 | 12/2002 |
| JP | 2004036414 | 2/2004 |
| WO | 9900585 | 1/1999 |
| WO | 2013007912 | 1/2013 |
| WO | 2014152701 | 9/2014 |
| WO | 2015030946 | 3/2015 |
| WO | 2015145034 A1 | 10/2015 |
| WO | WO-2016203157 A1 * | 12/2016 ........... F01D 17/148 |

OTHER PUBLICATIONS

European Search Report for Application No. EP17194050, dated Feb. 8, 2018 (6 pp.).

Extended European Search Report for Application No. 17181728.1-1607 dated Dec. 21, 2017 (8 pp.).

Extended European Search Report for Application No. 17181931.1-1607 dated Dec. 8, 2017 (7 pp.).

Extended European Search Report for Application No. 17181979.0-1607 dated Dec. 13, 2017 (8 pp.).

Extended European Search Report for Application No. 17182145.7-1607 dated Dec. 7, 2017 (7 pp.).

Extended European Search Report for Application No. 17182405.5-1607 dated Dec. 18, 2017 (7 pp.).

Extended European Search Report for Application No. 17182126.7-1007, dated Feb. 16, 2018 (7 pp.).

Extended European Search Report for Application No. 17199896.6-1006, dated Mar. 7, 2018 (11 pp.).

Calculation Method and Simulation of Air Bleeding Loss for Aircraft Start System; San Mai Su, et al., 2018 37th Chinese Control Conference (CCC); pp. 1764-1769; IEEE Conference; year 2018.

EP Application No. 17199896.6 Office Action dated Dec. 11, 2018, 3 pages.

Second law analysis of extra power requirements for a cascade of industrial compressors; S. Strevell et al, IECEC-97 Proceedings of the Thirty-Second Intersociety Energy Conversion Eng. Conf. (Cat No. 97CH6203); vol. 3, pp. 1581-1586; IEE Conf; year 1997.

* cited by examiner

METERED ORIFICE FOR MOTORING OF A GAS TURBINE ENGINE

BACKGROUND

This disclosure relates to gas turbine engines, and more particularly to systems and methods of using a metered orifice during motoring of a gas turbine engine.

Gas turbine engines are used in numerous applications, one of which is for providing thrust to an airplane. When the gas turbine engine of an airplane has been shut off for example, after an airplane has landed at an airport, the engine is hot and due to heat rise, the upper portions of the engine will be hotter than lower portions of the engine. When this occurs thermal expansion may cause deflection of components of the engine which may result in a "bowed rotor" condition. If a gas turbine engine is in such a bowed rotor condition, it is undesirable to restart or start the engine.

BRIEF DESCRIPTION

In an embodiment, a system for motoring a gas turbine engine of an aircraft is provided. The system includes an air turbine starter operable to drive rotation of a starting spool of the gas turbine engine and a starter air valve operable to deliver compressed air to the air turbine starter in response to the starter air valve being open. The system also includes a metered orifice coupled in a bypass configuration around the starter air valve to deliver a reduced amount of the compressed air to the air turbine starter while the starter air valve is closed. The reduced amount of the compressed air delivered to the air turbine starter limits a motoring speed of the gas turbine engine below a resonance speed of the starting spool of the gas turbine engine.

In addition to one or more of the features described above, or as an alternative to any of the foregoing embodiments, further embodiments may include where the compressed air is driven by an auxiliary power unit, a ground cart, or a cross engine bleed.

In addition to one or more of the features described above, or as an alternative to any of the foregoing embodiments, further embodiments may include a controller operable to determine a motoring time to mitigate a bowed rotor condition of the gas turbine engine and initiate opening of the starter air valve after the motoring time expires.

In addition to one or more of the features described above, or as an alternative to any of the foregoing embodiments, further embodiments may include where the controller is operable to monitor one or more parameters including: an engine speed of the gas turbine engine, a starter speed of the air turbine starter, and a starter air pressure.

In addition to one or more of the features described above, or as an alternative to any of the foregoing embodiments, further embodiments may include where the controller is operable to request an adjustment to the compressed air source based on the one or more parameters and/or adjust the motoring time based on the one or more parameters.

In addition to one or more of the features described above, or as an alternative to any of the foregoing embodiments, further embodiments may include a variable valve in series with the metered orifice in the bypass configuration around the starter air valve to dynamically control the reduced amount of the compressed air delivered to the air turbine starter.

In addition to one or more of the features described above, or as an alternative to any of the foregoing embodiments, further embodiments may include where a mitigation monitor determines whether bowed rotor mitigation was successful prior to allowing the motoring speed of the gas turbine engine to reach the resonance speed of the starting spool of the gas turbine engine.

A further embodiment is a system of an aircraft. The system includes an air turbine starter operable to drive rotation of a starting spool of a gas turbine engine of the aircraft in response to receiving compressed air and a starter air valve operable to deliver the compressed air to the air turbine starter in response to the starter air valve being open. The system also includes a metered orifice coupled in a bypass configuration around the starter air valve to deliver a reduced amount of the compressed air to the air turbine starter while the starter air valve is closed. The reduced amount of the compressed air delivered to the air turbine starter limits a motoring speed of the gas turbine engine below a resonance speed of the starting spool of the gas turbine engine. The system also includes a controller operable to determine a motoring time to mitigate a bowed rotor condition of the gas turbine engine and initiate opening of the starter air valve after the motoring time expires.

In addition to one or more of the features described above, or as an alternative to any of the foregoing embodiments, further embodiments may include a variable valve in series with the metered orifice in the bypass configuration around the starter air valve to dynamically control the reduced amount of the compressed air delivered to the air turbine starter based on one or more command signals from the controller.

Another embodiment includes a method for motoring of a gas turbine engine. The method includes determining, by a controller, a motoring time to mitigate a bowed rotor condition of the gas turbine engine. The method further includes delivering a reduced amount of compressed air through a metered orifice coupled in a bypass configuration around a starter air valve to an air turbine starter that limits a motoring speed of the gas turbine engine below a resonance speed of a starting spool of the gas turbine engine and initiating opening of the starter air valve after the motoring time expires.

In addition to one or more of the features described above, or as an alternative to any of the foregoing embodiments, further embodiments may include monitoring one or more parameters comprising: an engine speed of the gas turbine engine, a starter speed of the air turbine starter, and a starter air pressure.

In addition to one or more of the features described above, or as an alternative to any of the foregoing embodiments, further embodiments may include requesting an adjustment to the compressed air source based on the one or more parameters.

In addition to one or more of the features described above, or as an alternative to any of the foregoing embodiments, further embodiments may include adjusting the motoring time based on the one or more parameters and/or adjusting a valve between the starter air valve and the auxiliary power unit based on the one or more parameters.

In addition to one or more of the features described above, or as an alternative to any of the foregoing embodiments, further embodiments may include adjusting a variable valve in series with the metered orifice in the bypass configuration around the starter air valve to dynamically control the reduced amount of the compressed air delivered to the air turbine starter.

In addition to one or more of the features described above, or as an alternative to any of the foregoing embodiments, further embodiments may include determining whether bowed rotor mitigation was successful prior to allowing the motoring speed of the gas turbine engine to reach the resonance speed of the starting spool of the gas turbine engine.

A technical effect of the apparatus, systems and methods is achieved by using a compressed air source and a metered orifice for bowed rotor mitigation of one or more gas turbine engines as described herein.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
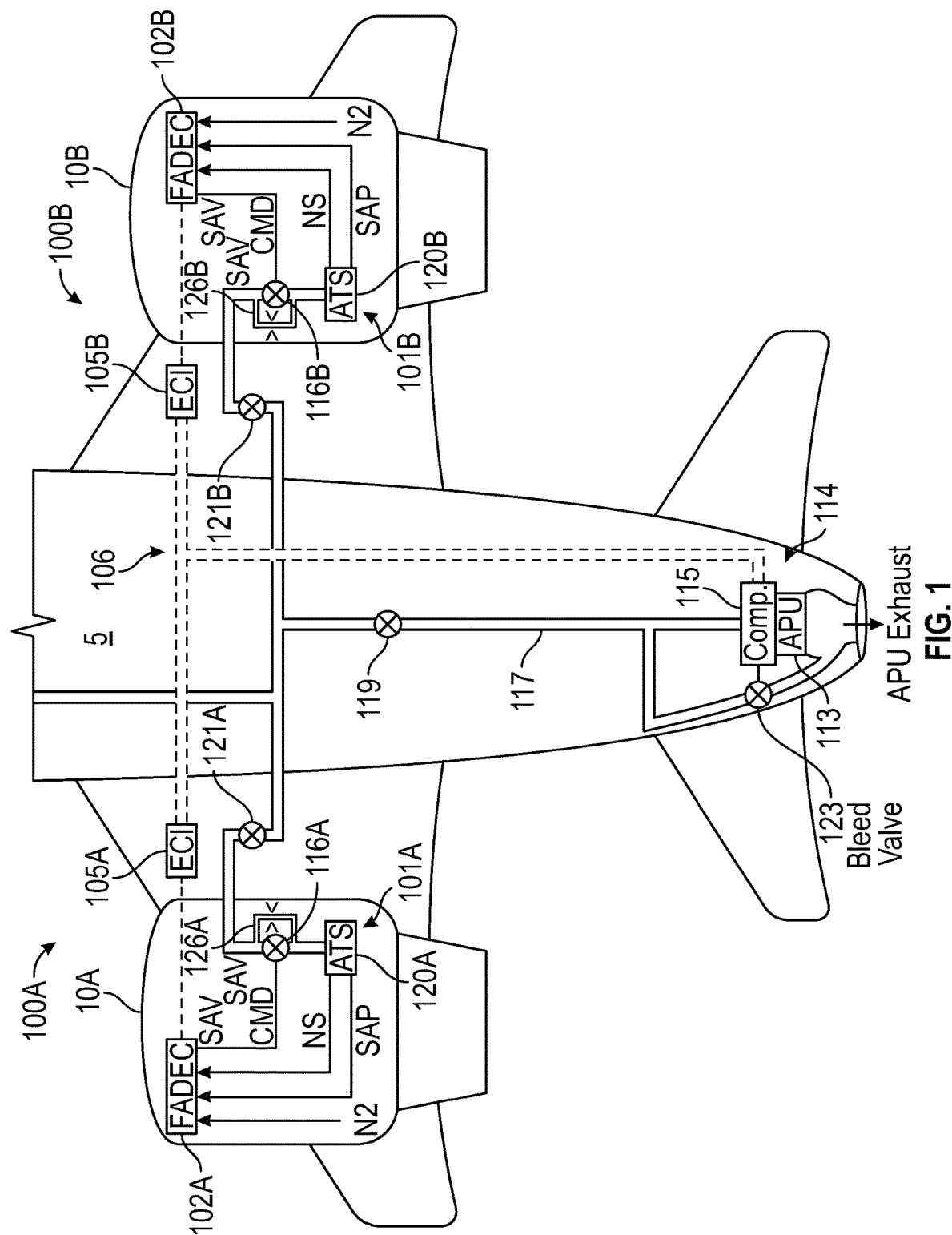
FIG. 1 is a schematic illustration of an aircraft engine starting system in accordance with an embodiment of the disclosure.

Various embodiments of the present disclosure are related to a bowed rotor start mitigation system in a gas turbine engine. Embodiments can include using a metered orifice to bypass a starter air valve and slowly turn (e.g., <10 revolutions per minute) a starting spool of the gas turbine engine to mitigate a bowed rotor condition using a dry motoring process. Rather than actively adjusting the starter air valve to control delivery of air pressure (i.e., compressed air) from an air supply to an air turbine starter of an engine starting system that controls starting spool rotor speed during dry motoring, embodiments passively limit the starting spool rotor speed using a metered orifice. Dry motoring is performed by running an engine starting system at a lower speed with a longer duration than typically used for engine starting. The metered orifice is sized to ensure that the rotor speed of the starting spool cannot reach a critical rotor speed, allowing thermal distortion to be decreased before the starter air valve is opened to accelerate beyond the critical rotor speed and complete the engine starting process. The critical rotor speed refers to a major resonance speed where, if the temperatures are unhomogenized, the combination of a bowed rotor and similarly bowed casing and the resonance would lead to high amplitude oscillation in the rotor and high rubbing of blade tips on one side of the rotor.

In some embodiments various parameters, such as a modeled temperature value of the gas turbine engine, can be used to estimate heat stored in the engine core when a start sequence is initiated and identify a risk of a bowed rotor. The modeled temperature value alone or in combination with other values (e.g., measured temperatures) can be used to calculate a bowed rotor risk parameter. For example, the modeled temperature can be adjusted relative to an ambient temperature when calculating the bowed rotor risk parameter. The bowed rotor risk parameter may be used to take a control action to mitigate the risk of starting the gas turbine engine with a bowed rotor. The control action can include maintaining the starter air valve in a closed position while a compressed air source supplies compressed air through a metered orifice that bypasses the starter air valve. Once the bowed rotor condition is mitigated, the starter air valve can be opened to allow engine starting.

A full authority digital engine control (FADEC) system or other system may send a message to the cockpit to inform the crew of an extended time start time due to bowed rotor mitigation actions prior to completing an engine start sequence. If the engine is in a ground test or in a test stand, a message can be sent to the test stand or cockpit based on the control-calculated risk of a bowed rotor. A test stand crew can be alerted regarding a requirement to keep the starting spool of the engine to a speed below the known resonance speed of the rotor in order to homogenize the temperature of the rotor and the casings about the rotor which also are distorted by temperature non-uniformity.

Referring now to FIG. 1, a schematic illustration of an aircraft 5 is depicted with a pair of engine systems 100A, 100B. Engine systems 100A, 100B include gas turbine engines 10A, 10B and engine starting systems 101A, 101B respectively. Engine systems 100A, 100B also include FADECs 102A, 102B to control gas turbine engines 10A, 10B and starting systems 101A, 101B. FADECs 102A, 102B may generally be referred to as controllers. FADECs 102A, 102B can communicate with respective engine control interfaces 105A, 105B using a digital communication bus 106. The engine control interfaces 105A, 105B can buffer engine system communication from aircraft level communication. Although depicted separately in FIG. 1, in some embodiments the engine control interfaces 105A, 105B are integrated with the FADECs 102A, 102B.

In an embodiment, the FADECs 102A, 102B and engine control interfaces 105A, 105B may each include memory to store instructions that are executed by one or more processors on one or more channels. The executable instructions may be stored or organized in any manner and at any level of abstraction, such as in connection with a controlling and/or monitoring operation of the gas turbine engines 10A, 10B of FIG. 1. The one or more processors can be any type of central processing unit (CPU), including a general purpose processor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and control algorithms in a non-transitory form.

In the example of FIG. 1, an auxiliary power unit (APU) 113 and compressor 115 provide a compressed air source 114 to drive air turbine starters 120A, 120B of engine starting systems 101A, 101B. Compressed air from the compressed air source 114 is routed through ducts 117 and starter air valves 116A, 116B to the air turbine starters 120A, 120B. Various shutoff valves can also be included in ducts 117, such as a main shutoff valve 119 and engine shutoff valves 121A, 121B. One or more bleed valves 123 can be used to release compressed air from the ducts 117.

In embodiments, FADECs 102A, 102B can observe various engine parameters and starting system parameters to actively control dry motoring and prevent fault conditions from damaging the gas turbine engines 10A, 10B. FADECs 102A, 102B can observe engine speeds (N2) of gas turbine engines 10A, 10B and may receive starter system parameters such as starter speeds (NS) and/or starter air pressures (SAP). For example, engine speed N2, starter speed NS, and/or starter air pressure SAP can be used to determine how dry motoring is progressing based on compressed air delivered through metered orifices 126A, 126B that bypass closed starter air valves 116A, 116B. Either or both of the FADECs 102A, 102B can request an adjustment to the compressed air source 114 based on the one or more parameters, for instance, by commanding the engine control interfaces 105A, 105B to initiate an adjustment action. The adjustment action can include sending notification to the APU 113 to command opening of the one or more bleed valves 123. Alternatively, the adjustment action can include adjusting one or more of the supply valves 119, 121A, 121B in this example.

In some cases, dry motoring can be performed simultaneously for engine systems 100A, 100B, where compressed air from the compressed air source 114 is provided to both air turbine starters 120A, 120B through metered orifices 126A, 126B at the same time. When one of the engine systems 100A, 100B completes dry motoring before the other, a disturbance or pressure surge of compressed air may be experienced at the metered orifice 126A, 126B and air turbine starter 120A, 120B of the engine system 100A, 100B still performing dry motoring. If this sudden increase in pressure results in difficulties for the FADEC 102A, 102B maintaining a motoring speed below a threshold level (i.e., the critical rotor speed) for the engine system 100A, 100B still performing dry motoring, this may also be viewed as a condition resulting in commanding an adjustment action, such as temporarily opening one or more bleed valves 123 to reduce and/or slowly ramp compressed air pressure.

Although FIG. 1 depicts one example configuration, it will be understood that embodiments as described herein can cover a wide range of configurations, such as a four engine system. Further, the compressed air source 114 can include multiple sources other than APU 113 and compressor 115, such as a ground cart or cross engine bleed air. An adjustment action can be selected to correspond with the source of compressed air in response to detecting a fault condition.

Figure 2:
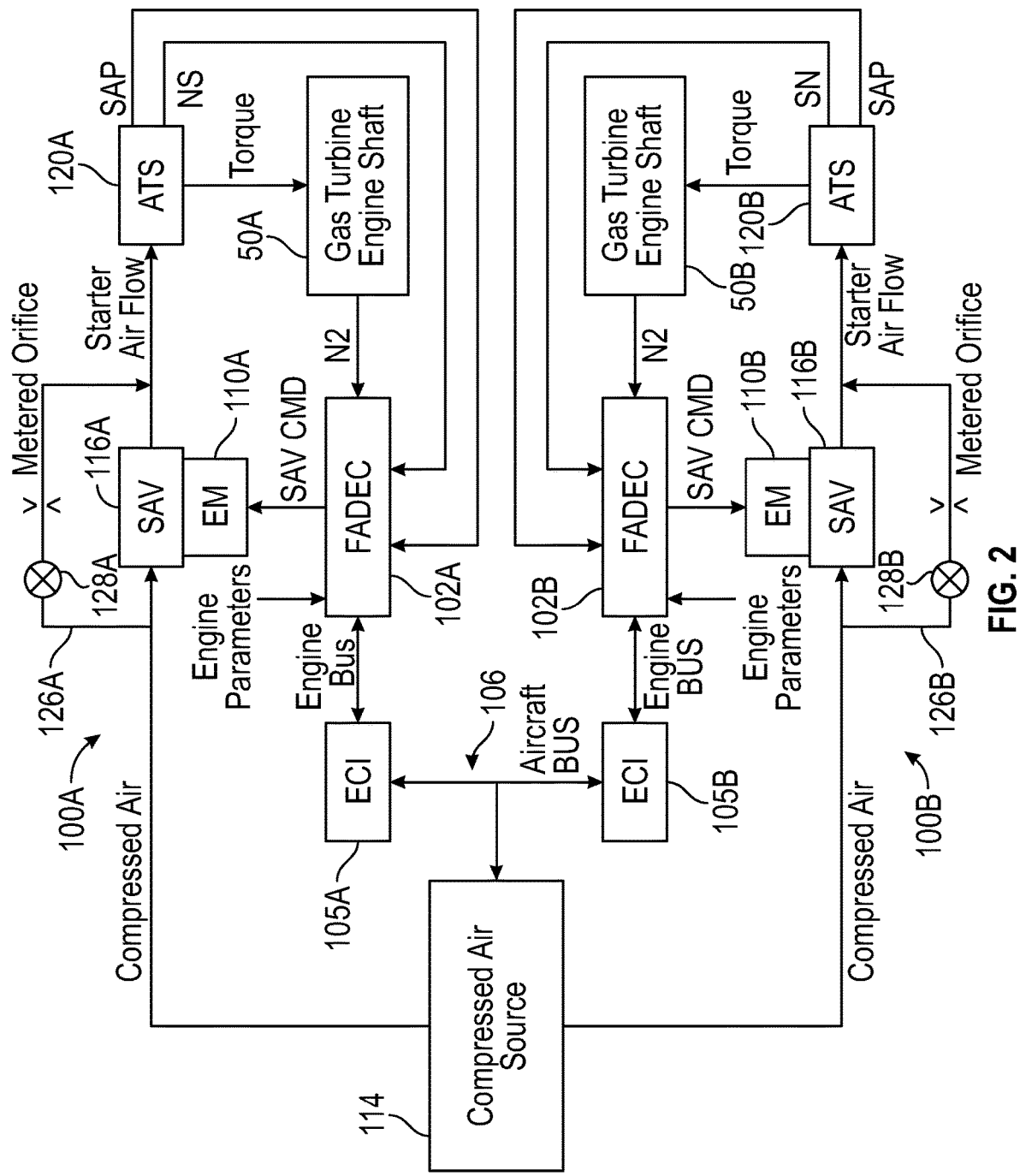
FIG. 2 is another schematic illustration of an aircraft engine starting system in accordance with an embodiment of the disclosure.

Turning now to FIG. 2, a schematic of engine systems 100A, 100B and engine starting systems 101A, 101B for the gas turbine engines 10A, 10B of FIG. 1 are depicted according to an embodiment. In the example of FIG. 2, the digital communication bus 106 can include an aircraft, engine, and/or test stand communication bus to interface with FADECs 102A, 102B, engine control interfaces 105A, 105B, aircraft controls, e.g., a cockpit, various onboard computer systems, and/or a test stand (not depicted). Either or both channels of FADECs 102A, 102B can commands to respective electromechanical devices 110A, 110B coupled to starter air valves 116A, 116B to achieve an open position of the starter air valves 116A, 116B to control a flow of compressed air from compressed air source 114 (e.g., APU 113 and compressor 115 of FIG. 1) as a starter air flow to air turbine starters 120A, 120B normal starting. During dry motoring, each metered orifice 126A, 126B coupled in a bypass configuration around the starter air valve 116A, 116B can deliver a reduced amount of the compressed air to the respective air turbine starter 120A, 120B while the starter air valve 116A, 116B is closed. The air turbine starters 120A, 120B output torque to drive rotation of respective gas turbine engine shafts 50A, 50B of starting spools of the gas turbine engines 10A, 10B.

The FADECs 102A, 102B can monitor engine speed (N2), starter speed (NS), starter air pressure (SAP), and/or other engine parameters to determine an engine operating state. Thus, the FADECs 102A, 102B can each establish a control loop with respect to a motoring speed (N2 and/or NS) to adjust the expected motoring time and/or request an adjustment to the compressed air source 114. In some embodiments, the starter air valves 116A, 116B are discrete valves designed as on/off valves that are typically commanded to either fully opened or fully closed. Pneumatic lines or mechanical linkage (not depicted) can be used to drive the starter air valves 116A, 116B between the open position and the closed position. The electromechanical devices 110A, 110B can each be a solenoid that positions the starter air valves 116A, 116B based on supplied electric power as commanded by the FADECs 102A, 102B. In an alternate embodiment, the electromechanical devices 110A, 110B are electric valves controlling muscle air to open/close the starter air valves 116A, 116B as commanded by the FADECs 102A, 102B.

In some embodiments, a variable valve 128A, 128B is coupled in series with the metered orifice 126A, 126B in the bypass configuration around the starter air valve 116A, 116B to dynamically control the reduced amount of the compressed air delivered to the air turbine starter 120A, 120B. Each variable valve 128A, 128B can be coupled upstream or downstream in series with the respective metered orifice 126A, 126B. Where the variable valve 128A, 128B is incorporated, the metered orifice 126A, 126B can be sized to support a predetermined pressure characteristic of the compressed air source 114 (e.g., a minimum expected operating pressure) to support a desired rotational speed (e.g., N2<=10 RPM). Adjustments to opened/closed positioning of the variable valves 128A, 128B can enable a reduction or variation of the rotational speed and/or accommodate variations in pressure of the compressed air source 114. Variable valve 128A, 128B may be controlled by one or more command signals of FADEC 102A, 102B and/or other controller(s).

Figure 3:
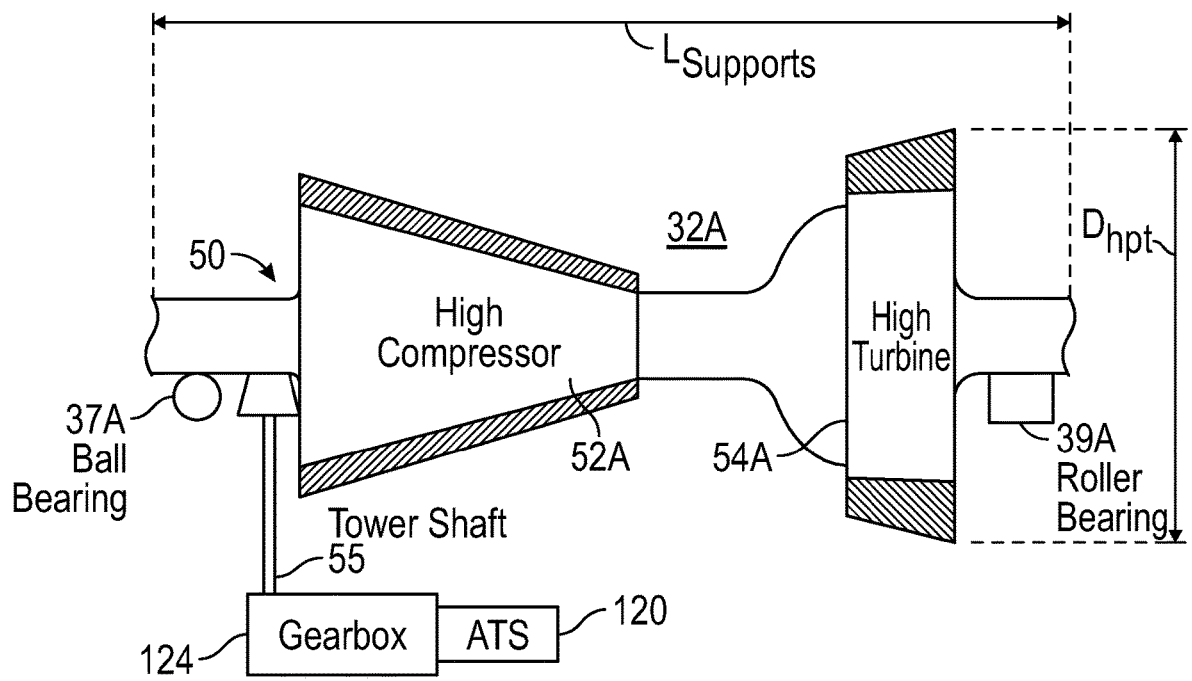
FIG. 3 is a schematic illustration of a high spool gas path with a straddle-mounted spool in accordance with an embodiment of the disclosure.
Figure 4:
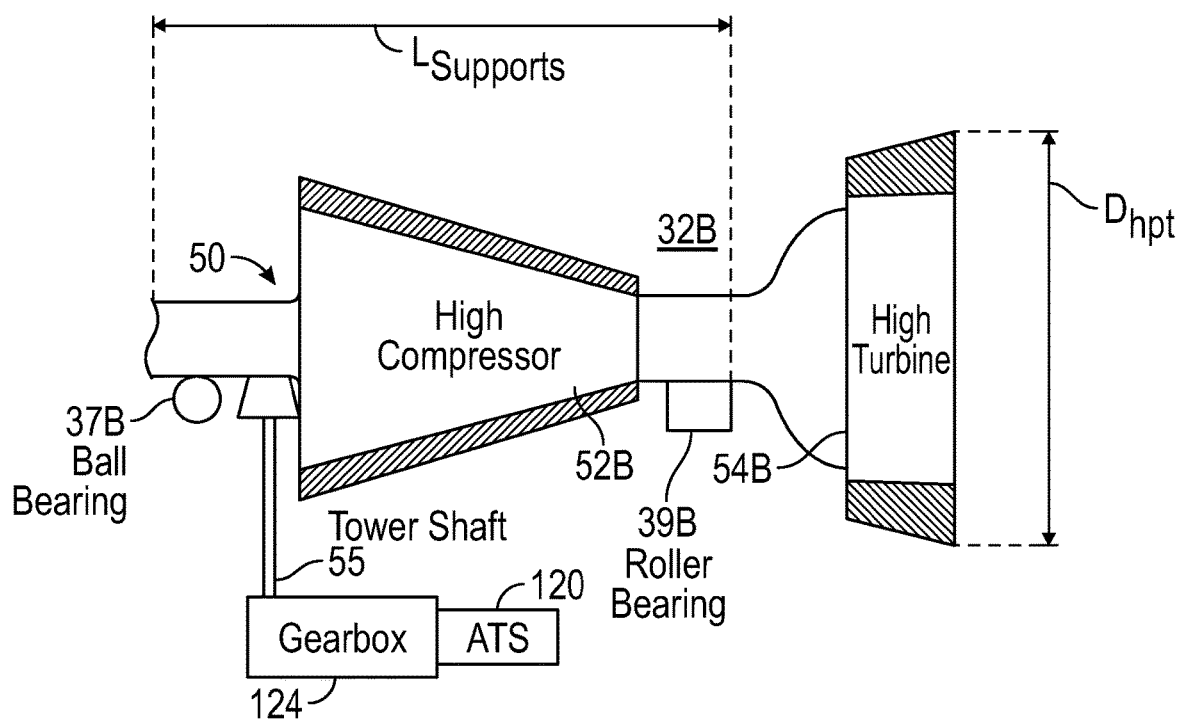
FIG. 4 is a schematic illustration of a high spool gas path with an overhung spool in accordance with an embodiment of the disclosure.

FIGS. 3 and 4 depict two example engine configurations of the gas turbine engines 10A, 10B of FIG. 1. FIG. 3 is an example of a straddle-mounted spool 32A as a starting spool configuration. This configuration places two bearing compartments 37A and 39A (which may include a ball bearing and a roller bearing respectively), outside of the plane of most of the compressor disks of high pressure compressor 52A and at outside at least one of the turbine disks of high pressure turbine 54A. In contrast with a straddle-mounted spool arrangement, other embodiments may be implemented using an over-hung mounted spool 32B as depicted in FIG. 4 as a starting spool configuration. In over-hung mounted spool 32B, a bearing compartment 37B is located forward of the first turbine disk of high pressure turbine 54B such that the high pressure turbine 54B is overhung, and it is physically located aft of its main supporting structure. The use of straddle-mounted spools has advantages and disadvantages in the design of a gas turbine, but one characteristic of the straddle-mounted design is that the span between the bearing compartments 37A and 39A is long, making the amplitude of the high spot of a bowed rotor greater and the resonance speed that cannot be transited prior to temperature homogenization is lower. For any thrust rating, the straddle mounted arrangement, such as straddle-mounted spool 32A, gives Lsupport/Dhpt values that are higher, and the overhung mounted arrangement, such as overhung spool 32B, can be as much as 60% of the straddle-mounted Lsupport/Dhpt. Lsupport is the distance between bearings (e.g., between bearing compartments 37A and 39A or between bearing compartments 37B and 39B), and Dhpt is the diameter of the last blade of the high pressure turbine (e.g., high pressure turbine 54A or high pressure turbine 54B). As one example, a straddle-mounted engine starting spool, such as straddle-mounted spool 32A, with a roller bearing at bearing compartment 39A located aft of the high pressure turbine 54A may be more vulnerable to bowed rotor problems since the Lsupport/Dhpt ranges from 1.9 to 5.6.

FIGS. 3 and 4 also illustrate an air turbine starter 120 (e.g., air turbine starter 120A or 120B of FIGS. 1 and 2) interfacing through gearbox 124 via a tower shaft 55 with the straddle-mounted spool 32A proximate high compressor 52A and interfacing via tower shaft 55 with the overhung mounted spool 32B proximate high compressor 52B as part of a starting system. The straddle-mounted spool 32A and the over-hung mounted spool 32B are both examples of a starter spool having a gas turbine engine shaft 50 driven by the air turbine starter 120, such as gas turbine engine shafts 50A, 50B driven by air turbine starters 120A, 120B of FIG. 2.

Figure 5:
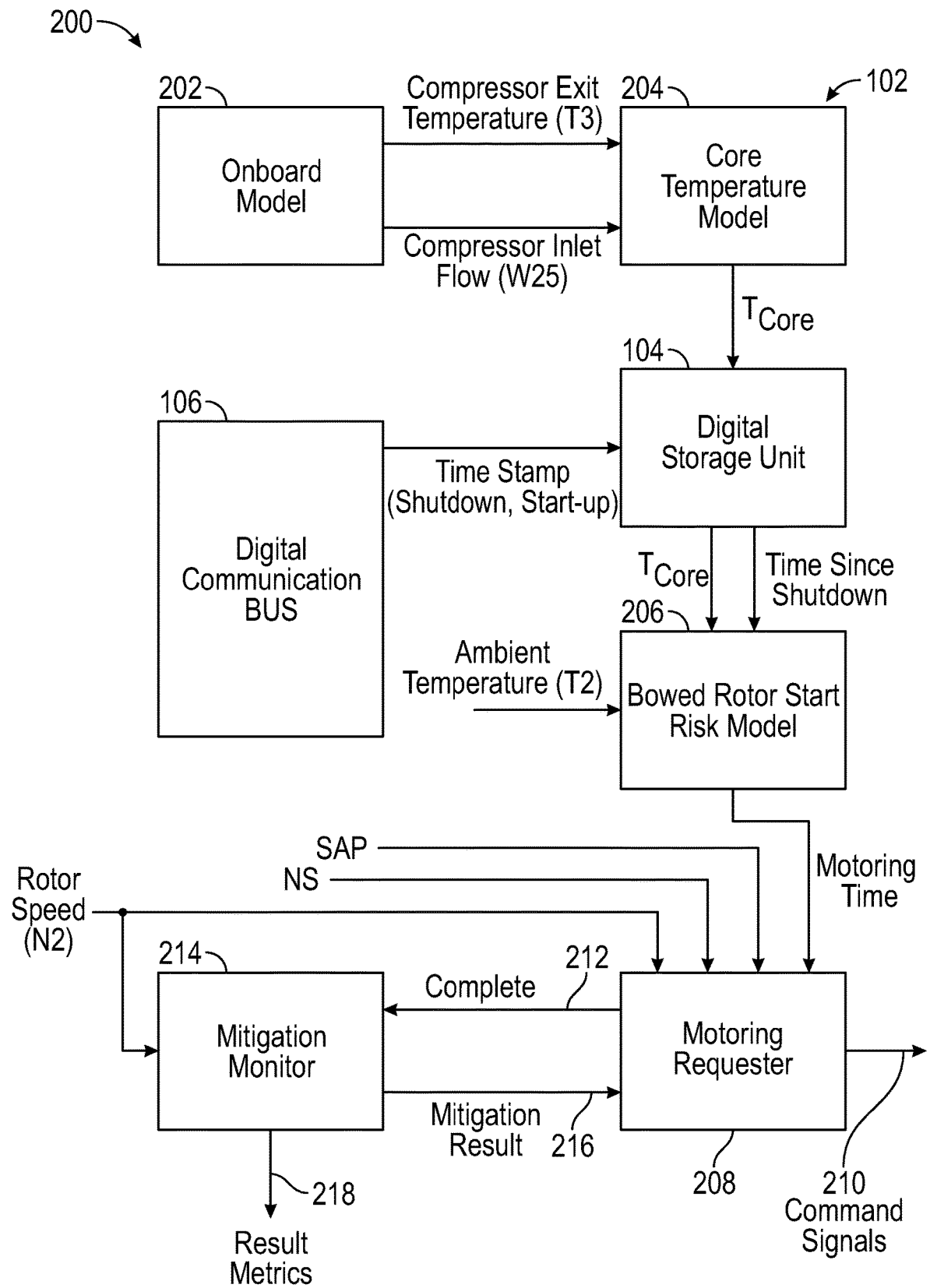
FIG. 5 is a block diagram of a system for bowed rotor start mitigation in accordance with an embodiment of the disclosure.

FIG. 5 is a block diagram of a system 200 for bowed rotor start mitigation that may control either of the starter air valves 116A, 116B of FIGS. 1 and 2 via command signals 210 in accordance with an embodiment. The system 200 may also be referred to as a bowed rotor start mitigation system. In the example of FIG. 5, the system 200 includes an onboard model 202 operable to produce a compressor exit temperature $T_3$ and a compressor inlet flow $W_{25}$ of one of the gas turbine engines 10A, 10B of FIG. 1 for use by a core temperature model 204. The onboard model 202 is configured to synthesize or predict major temperatures and pressures throughout one of the gas turbine engines 10A, 10B of FIG. 1 beyond those sensed by sensors positioned about the gas turbine engines 10A, 10B. The onboard model 202 and core temperature model 204 are examples of a first thermal model and a second thermal model that may be separately implemented or combined as part of a controller 102 (e.g., FADECs 102A, 102B of FIG. 1).

Engine parameter synthesis is performed by the onboard model 202, and the engine parameter synthesis may be performed using the technologies described in U.S. Patent Publication No. 2011/0077783, the entire contents of which are incorporated herein by reference thereto. Of the many parameters synthesized by onboard model 202 at least two are outputted to the core temperature model 204, $T_3$, which is the compressor exit gas temperature of each gas turbine engine 10A, 10B and $W_{25}$, which is the air flow through the compressor. Each of these values are synthesized by onboard model 202 and inputted into the core temperature model 204 that synthesizes or provides a heat state ($T_{core}$) of each gas turbine engine 10A, 10B. $T_{core}$ can be determined by a first order lag or function of $T_3$ and a numerical value X (e.g., $f(T_3, X)$), wherein X is a value determined from a lookup table stored in memory of controller 102. Accordingly, X is dependent upon the synthesized value of $W_{25}$. In other words, $W_{25}$ when compared to a lookup table of the core temperature model 204 will determine a value X to be used in determining the heat state or $T_{core}$ of each gas turbine engine 10A, 10B. In one embodiment, the higher the value of $W_{25}$ or the higher the flow rate through the compressor the lower the value of X.

The heat state of each engine 10A, 10B during use or $T_{core}$ is determined or synthesized by the core temperature model 204 as each engine 10A, 10B is being run. In addition, $T_3$ and $W_{25}$ are determined or synthesized by the onboard model 202 and/or the controller 102 as each engine 10A, 10B is being operated.

At engine shutdown, the current or most recently determined heat state of the engine or $T_{core\ shutdown}$ of an engine 10A, 10B is recorded into data storage unit (DSU) 104, and the time of the engine shutdown $t_{shutdown}$ is recorded into the DSU 104. The DSU 104 retains data between shutdowns using non-volatile memory. Each engine 10A, 10B may have a separate DSU 104. Time values and other parameters may be received on digital communication bus 106. As long as electrical power is present for the controller 102 and DSU 104, additional values of temperature data may be monitored for comparison with modeled temperature data to validate one or more temperature models (e.g., onboard model 202 and/or core temperature model 204) of each gas turbine engine 10A, 10B.

During an engine start sequence or restart sequence, a bowed rotor start risk model 206 (also referred to as risk model 206) of the controller 102 is provided with the data stored in the DSU 104, namely $T_{core\ shutdown}$ and the time of the engine shutdown $t_{shutdown}$. In addition, the bowed rotor start risk model 206 is also provided with the time of engine start $t_{start}$ and, optionally, the ambient temperature of the air provided to the inlet of each engine 10A, 10B $T_{inlet}$ or $T_2$. $T_2$, when used, can be a sensed value.

The bowed rotor start risk model 206 maps core temperature model data with time data and ambient temperature data to establish a motoring time $t_{motoring}$ as an estimated period of motoring to mitigate a bowed rotor of each gas turbine engine 10A, 10B. The motoring time $t_{motoring}$ is indicative of a bowed rotor risk parameter computed by the bowed rotor start risk model 206. For example, a higher risk of a bowed rotor may result in a longer duration of dry motoring to reduce a temperature gradient prior to starting each gas turbine engine 10A, 10B of FIG. 1. In one embodiment, an engine start sequence may automatically include a modified start sequence; however, the duration of the modified start sequence prior to a normal start sequence will vary based upon the time period $t_{motoring}$ that is calculated by the bowed rotor start risk model 206. The motoring time $t_{motoring}$ for predetermined target speed $N_{target}$ of each engine 10A, 10B is calculated as a function of $T_{core\ shutdown}$, $t_{shutdown}$, $t_{start}$ and $T_2$, (e.g., $f(T_{core\ shutdown}, t_{shutdown}, t_{start}$ and $T_2)$, while a target speed $N_{target}$ is a predetermined speed that can be fixed or vary within a predetermined speed range of $N_{targetMin}$ to $N_{targetMax}$. In other words, the target speed $N_{target}$ may be the same regardless of the calculated time period $t_{motoring}$ or may vary within the predetermined speed range of $N_{targetMin}$ to $N_{targetMax}$. The target speed $N_{target}$ may also be referred to as a dry motoring mode speed.

Based upon these values ($T_{core\ shutdown}$, $t_{shutdown}$, $t_{start}$ and $T_2$) the motoring time $t_{motoring}$ at a predetermined target speed $N_{target}$ for the modified start sequence of each engine 10A, 10B is determined by the bowed rotor start risk model 206. Based upon the calculated time period $t_{motoring}$ which is calculated as a time to run each engine 10A, 10B at a predetermined target speed $N_{target}$ in order to clear a "bowed condition". In accordance with an embodiment of the disclosure, the controller 102 can run through a modified start sequence upon a start command given to each engine 10A, 10B by an operator of the engines 10A, 10B, such as a pilot of an airplane the engines 10A, 10B are used with. It is understood that the motoring time $t_{motoring}$ of the modified start sequence may be in a range of 0 seconds to minutes, which depends on the values of $T_{core\ shutdown}$, $t_{shutdown}$, $t_{start}$ and $T_2$.

In an alternate embodiment, the modified start sequence may only be run when the bowed rotor start risk model 206 has determined that the motoring time $t_{motoring}$ is greater than zero seconds upon receipt of a start command given to each engine 10A, 10B. In this embodiment and if the bowed rotor start risk model 206 has determined that $t_{motoring}$ is not greater than zero seconds, a normal start sequence will be initiated upon receipt of a start command to each engine 10A, 10B.

Accordingly and during an engine command start, the bowed rotor start risk model 206 of the system 200 may be referenced wherein the bowed rotor start risk model 206 correlates the elapsed time since the last engine shutdown time and the shutdown heat state of each engine 10A, 10B as well as the current start time $t_{start}$ and the inlet air temperature $T_2$ in order to determine the duration of the modified start sequence wherein motoring of each engine 10A, 10B at a reduced speed $N_{target}$ without fuel and ignition is required. As used herein, motoring of each engine 10A, 10B in a modified start sequence refers to the turning of a starting spool by air turbine starter 120A, 120B at a reduced speed $N_{target}$ without introduction of fuel and an ignition source in order to cool the engine 10A, 10B to a point wherein a normal start sequence can be implemented without starting the engine 10A, 10B in a bowed rotor state. In other words, cool or ambient air is drawn into the engine 10A, 10B while motoring the engine 10A, 10B at a reduced speed in order to clear the "bowed rotor" condition, which is referred to as a dry motoring mode.

The bowed rotor start risk model 206 can output the motoring time $t_{motoring}$ to a motoring requester 208. The motoring requester 208 can command a starter air valve 116A, 116B closed during the motoring time while an air supply or compressed air source 114 delivers a reduced amount of compressed air through the metered orifice 126A, 126B coupled in a bypass configuration around the starter air valve 116A, 116 in order to limit the motoring speed of the engine 10A, 10B. In some embodiments the motoring speed varies in a pulsed sequence, for instance, depending on adjustments to upstream valves and/or the compressed air source 114. In other embodiments, the modeling can be omitted, and the motoring time can be set to an expected worst case value or may be received as a parameter on the digital communication bus 106.

A rotor speed N2 can be provided to the motoring requester 208 and a mitigation monitor 214, where motoring requester 208 and a mitigation monitor 214 may be part of controller 102. The motoring requester 208 can also receive one or more other parameters that may be monitored, such as starter speed NS, and/or starter air pressure SAP.

The risk model 206 can determine a bowed rotor risk parameter that is based on the heat stored ($T_{core}$) using a mapping function or lookup table. When not implemented as a fixed rotor speed, the bowed rotor risk parameter can have an associated dry motoring profile defining a target rotor speed profile over an anticipated amount of time for the motoring requester 208 to send command signals 210 to adjust an aspect of the compress air delivered from the compressed air source 114 and/or determine when dry motoring should be complete and command the starter air valves 116A, 116B to open as part of completing an engine starting process. In some embodiments, one or more command signals 210 adjust variable positioning states of variable valves 128A, 128B of FIG. 2.

The bowed rotor risk parameter may be quantified according to a profile curve selected from a family of curves that align with observed aircraft/engine conditions that impact turbine bore temperature and the resulting bowed rotor risk. In some embodiments, an anticipated amount of dry motoring time can be used to determine a target rotor speed profile in a dry motoring profile for the currently observed conditions. As one example, one or more baseline characteristic curves for the target rotor speed profile can be defined in tables or according to functions that may be rescaled to align with the observed conditions.

In summary with reference to FIG. 5, as one example of an aircraft that includes systems as described herein, onboard model 202 and core temperature model 204 may run on controller 102 of the aircraft to track heat stored ($T_{core}$) in the turbine at the time of engine shutdown. Modeling of potential heat stored in the system may be performed as a turbine disk metal temperature model in the core temperature model 204. When the aircraft lands, engines typically operate at idle for a cool down period of time, e.g., while taxiing to a final destination. When an engine shutdown is detected, model state data can be logged by the DSU 104 prior to depowering. When the controller 102 powers on at a later time and model state data can be retrieved from the DSU 104, and the bowed rotor start risk model 206 can be updated to account for the elapsed time. When an engine start is requested, a bowed rotor risk can be assessed with respect to the bowed rotor start risk model 206. Extended dry motoring can be performed during an engine start process until the bow risk has sufficiently diminished.

In reference to FIG. 5, the mitigation monitor 214 can operate in response to receiving a complete indicator 212 to run a verification of the bowed rotor mitigation. The mitigation monitor 214 can provide mitigation results 216 to the motoring requester 208 and may provide result metrics 218 to other systems, such a maintenance request or indicator. The mitigation monitor 214 may also run while dry motoring is active to determine whether adjustments to the dry motoring profile are needed. If the mitigation monitor 214 determines that a bowed rotor condition still exists, the motoring requester 208 may request restarting of dry motoring (e.g., ensuring that starter air valves 116A, 116B are closed and requesting compressed air), or a maintenance request or indicator can be triggered along with providing result metrics 218 for further analysis. Metrics of attempted bowed rotor mitigation can be recorded in the DSU 104 based on determining that the attempted bowed rotor mitigation was unsuccessful or incomplete.

Figure 6:
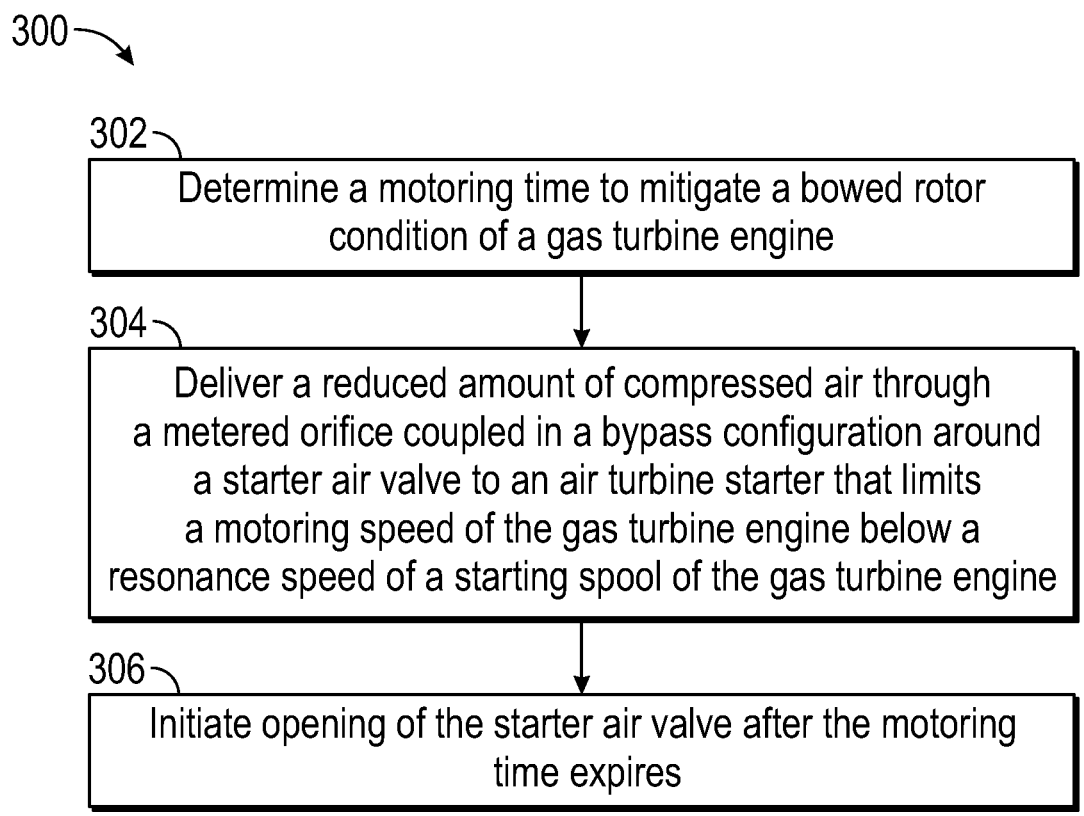
FIG. 6 is a flow chart illustrating a method in accordance with an embodiment of the disclosure.

FIG. 6 is a flow chart illustrating a method 300 motoring one or more of the gas turbine engines 10A, 10B of FIG. 1 in accordance with an embodiment. The method 300 of FIG. 6 is described in reference to FIGS. 1-5 and may be performed with an alternate order and include additional steps. Before initiating bowed rotor start mitigation, a bowed rotor determination step can be performed to estimate a need for bowed rotor start mitigation. Examples include the use of models and/or stored/observed engine/aircraft state data, such as data received from DSU 104, digital communication bus 106, and/or reading data from one or more temperature sensors of the gas turbine engines 10A, 10B.

At block 302, the controller 102 (e.g., FADEC 102A, 102B) can determine a motoring time to mitigate a bowed rotor condition of the gas turbine engine 10. The motoring time can be expressed as a delay time to hold a starter air valve (e.g., starter air valves 116A, 116B) closed compressed air is delivered to an air turbine starter (e.g., air turbine starters 120A, 120B) through a metered orifice 126A, 126B during motoring of either or both of the gas turbine engines 10A, 10B. In some embodiments, the motoring time is a fixed worst-case value. In other embodiments, the motoring time is determined dynamically as previously described with respect to FIG. 5.

At block 304, a reduced amount of compressed air is delivered through a metered orifice 126A, 126B coupled in a bypass configuration around a starter air valve 116A, 116B to an air turbine starter 120A, 120B that limits a motoring speed of the gas turbine engine 10A, 10B below a resonance speed of a starting spool of the gas turbine engine 10A, 10B. The compressed air can be driven, for example, by an auxiliary power unit, a ground cart, or a cross engine bleed. The controller 102 can monitor one or more parameters including: an engine speed (N2) of the gas turbine engine 10A, 10B, a starter speed (NS) of the air turbine starter 102A, 102B, and/or a starter air pressure (SAP). The controller 102 can request an adjustment to the compressed air source 114 based on the one or more parameters. The adjustment can include adjusting a valve (e.g., valve 119, 121A, 121B, 123) between the starter air valve 116A, 116B and the auxiliary power unit 113 based on the one or more parameters. The controller 102 can relay a command for an adjustment to the auxiliary power unit 113 through an engine control interface 105A, 105B using a digital communication bus 106. The controller 102 may adjust the motoring time based on the one or more parameters. Alternatively or additionally, the controller 102 can adjust a variable valve 128A, 128B in series with the metered orifice 126A, 126B in the bypass configuration around the starter air valve 116A, 116B to dynamically control the reduced amount of the compressed air delivered to the air turbine starter 120A, 120B. The controller 102 may also determine whether bowed rotor mitigation was successful prior to allowing the motoring speed of the gas turbine engine 10A, 10B to reach the resonance speed of the starting spool of the gas turbine engine 10A, 10B, for instance, as previously described in reference to FIG. 5.

At block 306, the controller 102 initiates opening of the starter air valve 116A, 116B after the motoring time expires.

Accordingly and as mentioned above, it is desirable to detect, prevent and/or clear a "bowed rotor" condition in a gas turbine engine that may occur after the engine has been shut down. As described herein and in one non-limiting embodiment, the FADECs 102A, 102B (e.g., controller 102) may be programmed to automatically take the necessary measures in order to provide for a modified start sequence without pilot intervention other than the initial start request. In an exemplary embodiment, the FADECs 102A, 102B, DSU 104 and/or engine control interfaces 105A, 105B comprises a microprocessor, microcontroller or other equivalent processing device capable of executing commands of computer readable data or program for executing a control algorithm and/or algorithms that control the start sequence of the gas turbine engine. In order to perform the prescribed functions and desired processing, as well as the computations therefore (e.g., the execution of Fourier analysis algorithm(s), the control processes prescribed herein, and the like), the FADECs 102A, 102B, DSU 104 and/or engine control interfaces 105A, 105B may include, but not be limited to, a processor(s), computer(s), memory, storage, register(s), timing, interrupt(s), communication interfaces, and input/output signal interfaces, as well as combinations comprising at least one of the foregoing. For example, the FADECs 102A, 102B, DSU 104 and/or engine control interfaces 105A, 105B may include input signal filtering to enable accurate sampling and conversion or acquisitions of such signals from communications interfaces. As described above, exemplary embodiments of the disclosure can be implemented through computer-implemented processes and apparatuses for practicing those processes.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A system for motoring a gas turbine engine of an aircraft, the system comprising:
    an air turbine starter operable to drive rotation of a starting spool of the gas turbine engine;
    a first duct coupled to a compressed air source;
    a second duct coupled to the air turbine starter;
    a starter air valve coupled to the first duct and the second duct, the starter air valve operable to receive compressed air from the compressed air source through the first duct and deliver the compressed air through the second duct to the air turbine starter in response to the starter air valve being open;
    a metered orifice coupled to the first duct and the second duct in a bypass configuration around the starter air valve, the metered orifice sized to deliver a reduced amount of the compressed air from the first duct to the second duct and the air turbine starter while the starter air valve is closed; and
    a controller configured to:
        determine a motoring time to mitigate a bowed rotor condition of the gas turbine engine at a target speed set based on the reduced amount of the compressed air delivered through the metered orifice to the air turbine starter while the starter air valve is closed, wherein the reduced amount of the compressed air delivered to the air turbine starter limits a motoring speed of the gas turbine engine below a resonance speed of the starting spool of the gas turbine engine; and
        initiate opening of the starter air valve after the motoring time expires to start the gas turbine engine.

2. The system as in claim 1, wherein the compressed air source comprises an auxiliary power unit, a ground cart, or a cross engine bleed.

3. The system as in claim 1, wherein the controller is operable to monitor one or more parameters comprising: an engine speed of the gas turbine engine, a starter speed of the air turbine starter, and a starter air pressure.

4. The system as in claim 3, wherein the controller is operable to request an adjustment to the compressed air source based on the one or more parameters and/or adjust the motoring time based on the one or more parameters.

5. The system as is claim 1, further comprising a variable valve in series with the metered orifice in the bypass configuration around the starter air valve to dynamically control the reduced amount of the compressed air delivered to the air turbine starter.

6. The system as in claim 1, wherein a mitigation monitor determines whether bowed rotor mitigation was successful prior to allowing the motoring speed of the gas turbine engine to reach the resonance speed of the starting spool of the gas turbine engine.

7. A system of an aircraft, the system comprising:
an air turbine starter operable to drive rotation of a starting spool of a gas turbine engine of the aircraft in response to receiving compressed air;
a first duct coupled to a compressed air source;
a second duct coupled to the air turbine starter;
a starter air valve coupled to the first duct and the second duct, the starter air valve operable to deliver the compressed air through the second duct to the air turbine starter in response to the starter air valve being open;
a metered orifice coupled to the first duct and the second duct in a bypass configuration around the starter air valve, the metered orifice sized to deliver a reduced amount of the compressed air from the first duct to the second duct and the air turbine starter while the starter air valve is closed; and
a controller configured to:
determine a motoring time to mitigate a bowed rotor condition of the gas turbine engine at a target speed set based on the reduced amount of the compressed air delivered through the metered orifice to the air turbine starter while the starter air valve is closed, wherein the reduced amount of the compressed air delivered to the air turbine starter limits a motoring speed of the gas turbine engine below a resonance speed of the starting spool of the gas turbine engine; and
initiate opening of the starter air valve after the motoring time expires.

8. The system of claim 7, wherein the controller is operable to monitor one or more parameters comprising: an engine speed of the gas turbine engine, a starter speed of the air turbine starter, and a starter air pressure.

9. The system of claim 8, wherein the compressed air source comprises an auxiliary power unit and the controller is operable to request an adjustment to the auxiliary power unit based on the one or more parameters.

10. The system of claim 8, wherein the compressed air source comprises an auxiliary power unit and the controller is operable to adjust the motoring time based on the one or more parameters and/or adjust a valve between the starter air valve and the auxiliary power unit based on the one or more parameters.

11. The system of claim 7, further comprising a variable valve in series with the metered orifice in the bypass configuration around the starter air valve to dynamically control the reduced amount of the compressed air delivered to the air turbine starter based on one or more command signals from the controller.

12. The system of claim 7, wherein a mitigation monitor determines whether bowed rotor mitigation was successful prior to allowing the motoring speed of the gas turbine engine to reach the resonance speed of the starting spool of the gas turbine engine.

13. A method for motoring of a gas turbine engine, the method comprising:
receiving compressed air from a compressed air source through a first duct coupled to the compressed air source and a starter air valve, the starter air valve controlling delivery of the compressed air from the first duct through a second duct to an air turbine starter;
delivering a reduced amount of the compressed air through a metered orifice coupled to the first duct and the second duct in a bypass configuration around the starter air valve to the air turbine starter while the starter air valve is closed;
determining, by a controller, a motoring time to mitigate a bowed rotor condition of the gas turbine engine at a target speed set based on the reduced amount of the compressed air delivered through the metered orifice to the air turbine starter while the starter air valve is closed, wherein the reduced amount of the compressed air delivered to the air turbine starter limits a motoring speed of the gas turbine engine below a resonance speed of a starting spool of the gas turbine engine; and
initiating opening of the starter air valve after the motoring time expires to start the gas turbine engine.

14. The method as in claim 13, wherein the compressed air source comprises an auxiliary power unit, a ground cart, or a cross engine bleed.

15. The method as in claim 13, further comprising monitoring one or more parameters comprising: an engine speed of the gas turbine engine, a starter speed of the air turbine starter, and a starter air pressure.

16. The method as in claim 15, further comprising requesting an adjustment to the compressed air source based on the one or more parameters.

17. The method as in claim 15, wherein the compressed air source comprises an auxiliary power unit and further comprising adjusting the motoring time based on the one or more parameters and/or adjusting a valve between the starter air valve and the auxiliary power unit based on the one or more parameters.

18. The method as in claim 13, further comprising adjusting a variable valve in series with the metered orifice in the bypass configuration around the starter air valve to dynamically control the reduced amount of the compressed air delivered to the air turbine starter.

19. The method as in claim 13, further comprising determining whether bowed rotor mitigation was successful prior to allowing the motoring speed of the gas turbine engine to reach the resonance speed of the starting spool of the gas turbine engine.

* * * * *